United States Patent
McRae (10) Patent No.: US 8,631,168 B2
(45) Date of Patent: Jan. 14, 2014

(54) INPUT SELECTION MECHANISM FOR A DISPLAY DEVICE

(75) Inventor: Metthew Blake McRae, Laguna Beach, CA (US)

(73) Assignee: Vizio Inc., Irvine, CA (US)

( * ) Notice: Subject to any disclaimer, the term of this patent is extended or adjusted under 35 U.S.C. 154(b) by 175 days.

(21) Appl. No.: 12/824,488

(22) Filed: Jun. 28, 2010

(65) Prior Publication Data
US 2011/0317071 A1 Dec. 29, 2011

(51) Int. Cl.
*G06F 3/00* (2006.01)

(52) U.S. Cl.
USPC ............... 710/17; 710/38; 710/104; 710/305; 710/306; 710/309; 710/316; 710/317; 324/207.15; 324/207.16

(58) Field of Classification Search
None
See application file for complete search history.

(56) References Cited

U.S. PATENT DOCUMENTS

| | | | | |
|---|---|---|---|---|
| 5,408,618 | A * | 4/1995 | Aho et al. | 710/104 |
| 5,867,484 | A * | 2/1999 | Shaunfield | 370/395.51 |
| 7,690,017 | B2 * | 3/2010 | Stecyk et al. | 725/80 |
| 2002/0174270 | A1 * | 11/2002 | Stecyk et al. | 710/1 |
| 2005/0212510 | A1 * | 9/2005 | Kirchdoerffer et al. | 324/207.15 |
| 2006/0023069 | A1 * | 2/2006 | Saito | 348/207.99 |
| 2007/0153131 | A1 * | 7/2007 | Yang et al. | 348/705 |
| 2007/0153132 | A1 * | 7/2007 | Jong | 348/705 |
| 2007/0285568 | A1 * | 12/2007 | Kurose | 348/563 |
| 2008/0022019 | A1 * | 1/2008 | Fan Chiang et al. | 710/15 |
| 2009/0174816 | A1 * | 7/2009 | Hellman et al. | 348/553 |
| 2009/0225228 | A1 * | 9/2009 | Engel et al. | 348/705 |
| 2010/0073560 | A1 * | 3/2010 | Kitano et al. | 348/554 |

OTHER PUBLICATIONS

'Measuring Input and Output Impedance' by Andy Collinson, last version posted on the internet on Dec. 19, 2008.*
Internet Archive Wayback Machine for http://www.zen22142.zen.co.uk/Theory/inzoz.htm, showing posting dates for Collinson article.*
'Capacitance/Impedance Measurements' document from National Instruments, Jan. 15, 2009.*
'Exploring Optical and Magnetic Sensors' Design Article by Stuart Ball for EE Times, Jun. 17, 2003.*
'Electrical Impedance' article from Wikipedia, Jun. 6, 2010.*
'What are Proximity Switches?' article by J. Dellaporta, found at wisegeek.com, archived from Mar. 8, 2009.*
'Three-state logic' article found on Wikipedia.org, archived from Aug. 16, 2009.*
'MC68LC302 Low Power Integrated Multiprotocol Processor Reference Manual' by Motorola, Feb. 24, 2007.*
All Datasheet archived web page from Feb. 24, 2007, showing the MC68LC302 datasheet.*
'Electronics Tutorial about Multiplexers' by Wayne Storr, copyright 2009, archived web page from Apr. 29, 2009.*

* cited by examiner

*Primary Examiner* — Steven Snyder
(74) *Attorney, Agent, or Firm* — Law Offices of Scott C. Harris, Inc.

(57) ABSTRACT

A television includes at least two ports (e.g. HDMI ports). The television polls the ports before presenting a user interface that displays some or all of the ports and before toggling between any two of the ports. The polling ascertains whether a device is connected to each of the ports and whether the device is powered. The television modifies the display and/or toggling based on the current state of each port. For example, in toggling, ports that are not connected and ports that are connected to inactive devices are skipped. In another example, when displaying a list of ports, only those ports that are connected to devices appear in the list.

13 Claims, 7 Drawing Sheets

INPUT SELECTION MECHANISM FOR A DISPLAY DEVICE

FIELD

This invention relates to the field of display devices and more particularly to a system for detecting secondary devices connected to a primary device such as a television.

BACKGROUND

Devices such as LCD or Plasma televisions are becoming more sophisticated each year. Already, most have a processor and memory and a remote control as an input device. Often, the television is connected to a multitude of content sources such as cable-television set-top-boxes, Blu-ray players, DVD disk players, Video Cassette Recorders (VCR), game consoles, media players (e.g. IPod), etc.

A typical display device (e.g. television) typically has a large number of ports for connecting devices. There are many types of ports (unidirectional or bidirectional) including High Definition Multimedia Interface (HDMI) ports, component video ports, universal serial bus ports (USB), composite video ports, S-video ports, etc. As the number of ports and types of ports grow, the selection and configuration of these ports become complex. Some televisions have four HDMI ports, a component port, a composite port, an S-Video port and several USB ports. This presents increased user complexity when configuring the television, when selecting an active input device and when toggling between input devices. For example, in a system having six HDMI ports and a remote control having a "next" HDMI function; pressing of the HDMI function on the remote, sequences from HDMI-1 to HDMI-2. Pressing the HDMI function again changes to the HDMI-3 input, etc. To switch from HDMI-1 to HDMI-6, the HDMI function must be pressed five times.

Often, a television/display has many more ports than it has devices connected to those ports. A television having six HDMI inputs often only has a Blu-ray disk player and a set-top-box (e.g. cable box) attached to two of the six inputs. In such, sequential toggling between these devices requires on average, skipping two empty ports to get to the active ports. This also requires the viewer to remember that the Blu-ray disk is connected to, for example, the HDMI-1 port and the set-top-box is connected to the HDMI-3 port, etc. Furthermore, even when all ports have connected devices, it doesn't make sense to toggle to a port connected to a device that is not generating a signal (e.g. the device is off).

What is needed is a display/television system that will detect which ports are connected to devices and which devices are active.

SUMMARY

The present invention includes a primary device having a display, for example a television. The primary device has at least two input ports (e.g. HDMI ports). The primary device (e.g. television) polls the ports before presenting a user interface that displays some or all of the ports and before toggling between any two of the ports. The polling ascertains whether a secondary device is connected to each of the ports and, optionally, whether the secondary device is powered. The television modifies display and/or toggling functionality based on the current state of each port. For example, in toggling, ports that are not connected and ports that are connected to inactive secondary devices are skipped. In another example, when displaying a list of ports, only those ports that are connected to secondary devices appear in the list. In yet another example, when displaying a list of ports, only those ports that are connected to active secondary devices (those that are turned on) appear in the list. In some embodiments, ports with active secondary devices are prioritized (e.g. displayed at the top of the list).

In one embodiment, a system for determining which ports of a primary device (e.g. television) are connected to secondary devices is disclosed including, a a primary device having a plurality of ports and a mechanism for determining if a secondary device is connected to each port. An example of such a mechanism is measuring the impedance of the port, detecting a signal from the port (e.g. audio or video) and a response to a query In another embodiment, a method of determining which ports of a primary device (e.g. television) are connected to a secondary device is disclosed including (a) selecting a first port of the primary device as a current port. (b) Measuring an impedance of the current port and (c) if the impedance is high, marking the current port as being open and (d) if the impedance is low, marking the current port as being connected to a secondary device. (e) If the primary device has more ports, selecting a next port of the primary device as the current port and repeating steps b-e.

In another embodiment, a television is disclosed including a processor with a plurality of ports connected to the processor through a multiplexor. Software running on the processor determines which of the ports are connected to secondary devices by, for example, sequentially emitting a known frequency at a known amplitude to each of the ports through a multiplexor and measuring a current through the multiplexor. Software running on the processor determines if the impedance indicates a secondary device is connected to the each port.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments, examples of which are illustrated in the accompanying drawings. Throughout the following detailed description, the same reference numerals refer to the same elements in all figures. For brevity, a television is used in this description as an example of a primary device that has two or more input ports for connecting to secondary devices. Many other secondary devices, including, but not limited to, audio-video components, receivers, mobile televisions, etc, are anticipated and included here within. In the examples described, the television 5 is a primary device and a DVD player disk player 12 and cable modem 14 are examples of secondary devices.

Figure 1:
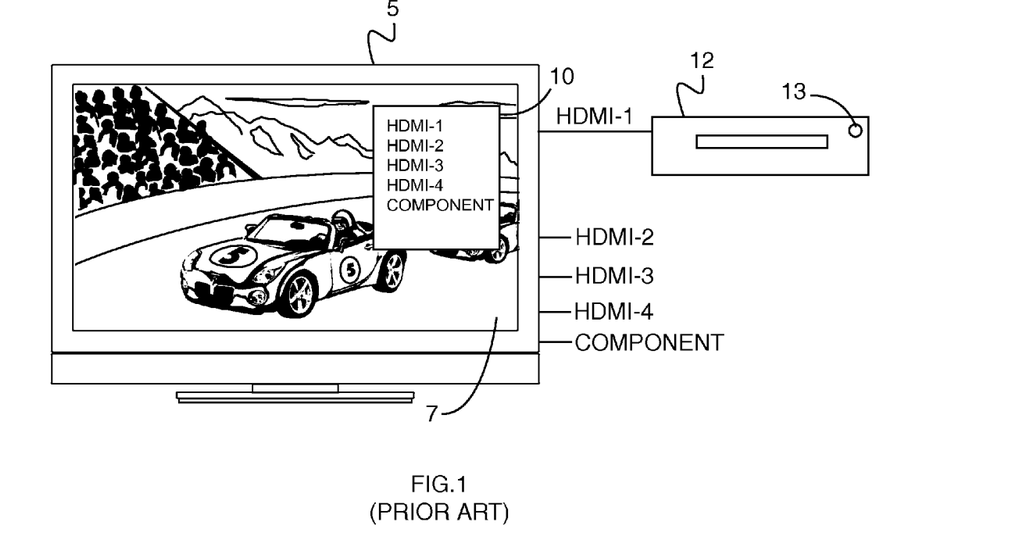
FIG. 1 illustrates a schematic view of a television with a typical input selection on-screen display of the prior art.

Referring to FIG. 1, a schematic view of a television 5 with a typical input selection on-screen display 10 of the prior art will be described. The selection menu 10 contains all inputs (HDMI 1-4 and Component) even though only one device 12 (e.g. a DVD player 12) is connected to one HDMI port (HDMI-1). The device 12 has a power on/off indicator 13.

Figure 2:
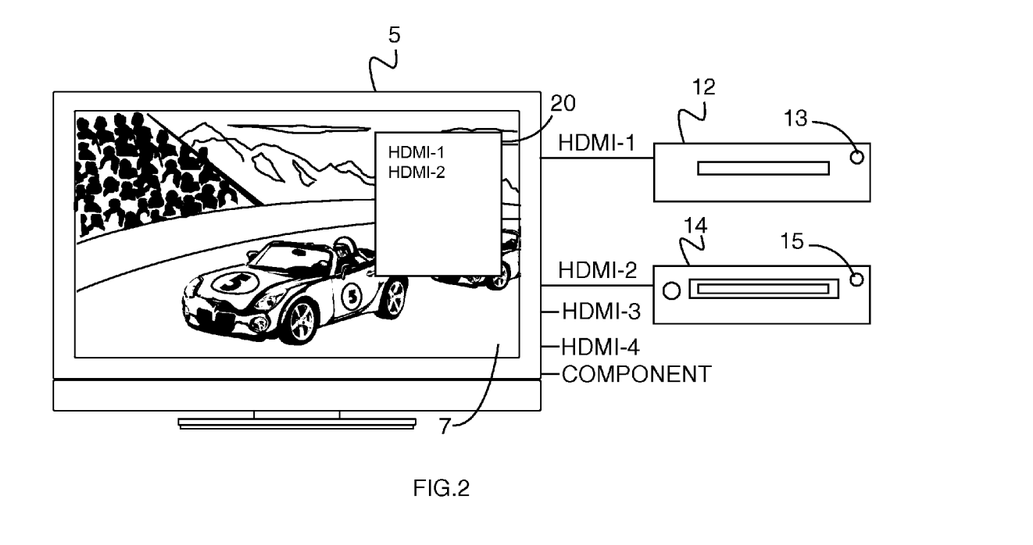
FIG. 2 illustrates a schematic view of a television having five inputs, two of which are connected.

Referring to FIG. 2, a schematic view of a television 5 having five inputs will be described, two of which are connected to devices 12/14. In this exemplary user interface, two devices 12/14 such as a DVD player disk player 12 and a cable modem 14 are connected to the HDMI-1 and HDMI-2 ports, respectively. The HDMI-3, HDMI-4 and Component ports are not connected to anything. In this example, the television 5 has determined that the HDMI-3, HDMI-4 and Component ports have nothing connected and has abbreviated the menu 20 to include only the ports that have devices connected. Both devices have a power on/off indicator 13/15.

Figure 3:
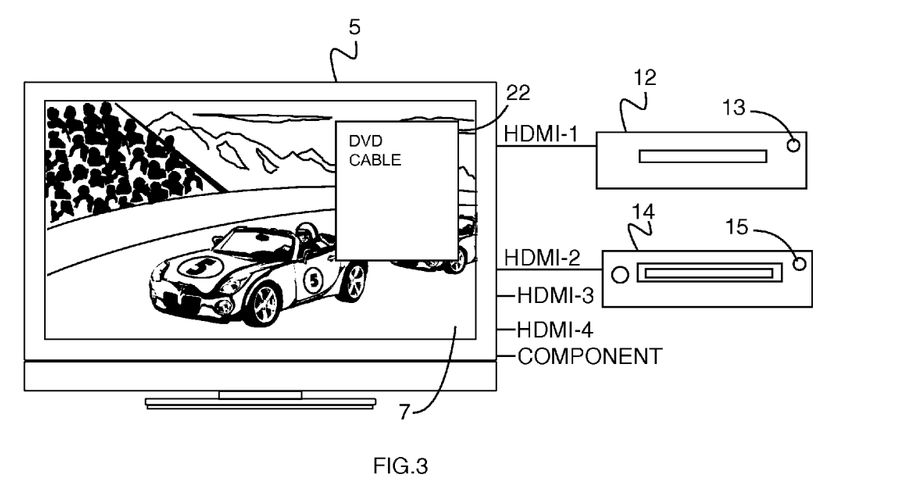
FIG. 3 illustrates a second schematic view of a television having five inputs, two of which are connected.

Referring to FIG. 3, a second schematic view of a television 5 having five inputs will be described, two of which are connected to devices 12/14. In this exemplary user interface, two devices 12/14 such as a DVD player disk player 12 and a cable modem 14 are connected to the HDMI-1 and HDMI-2 ports, respectively. The HDMI-3, HDMI-4 and Component ports are not connected to anything. In this example, the television 5 has determined that the HDMI-3, HDMI-4 and Component ports have nothing connected and has abbreviated the menu 20 to include only the ports that have devices connected. In this embodiment, instead of displaying the nomenclature of the port (e.g. HDMI-1), a more meaningful tag (DVD, CABLE) is displayed. It is anticipated that, in some embodiments, the tag is created and associated with the respective port through an on-screen user interface. In some embodiments, the tag is determined by querying the device for a name or class and associating the name with the respective port. Both devices have a power on/off indicator 13/15.

Figure 4:
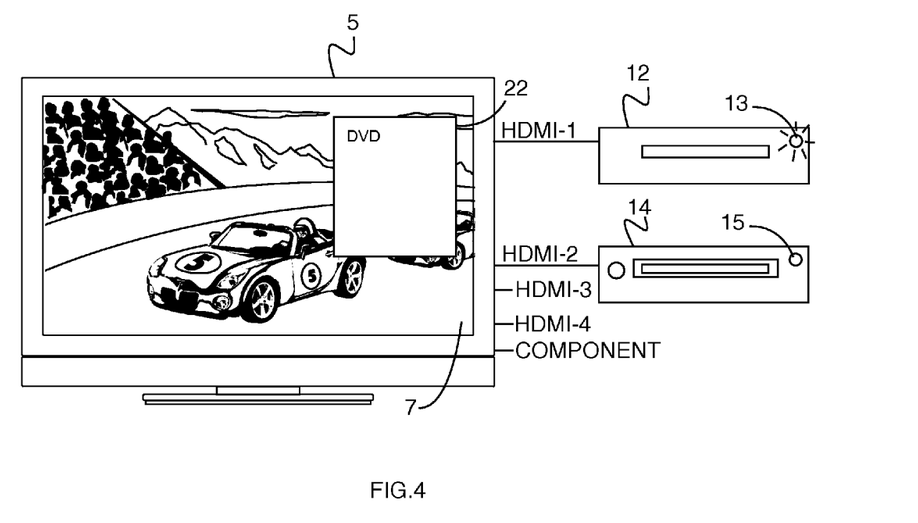
FIG. 4 illustrates a third schematic view of a television having five inputs, two of which are connected and one is active.

Referring to FIG. 4, a third schematic view of a television 5 having five inputs will be described, two of which are connected to devices 12/14. In this exemplary user interface, two devices 12/14 such as a DVD player disk player 12 and a cable modem 14 are connected to the HDMI-1 and HDMI-2 ports, respectively. The HDMI-3, HDMI-4 and Component ports are not connected. The DVD player disk 12 is powered on as indicated by the DVD player disk power indicator 13 and the cable modem 14 is not active (off), as indicated by the cable modem power indicator 15.

In this example, the television 5 has determined that the HDMI-3, HDMI-4 and Component ports have nothing connected. Furthermore, the television 5 has determined that the cable modem 14 connected to the HDMI-2 port is not active (off or standby). The television has abbreviated the menu 20 to include only the ports that have devices connected and active; in this example, only the DVD player 12. In this embodiment, instead of displaying the nomenclature of the port (e.g. HDMI-1), a more meaningful tag (DVD, CABLE, etc) is displayed. It is anticipated that, in some embodiments, the tag is created and associated with the respective port through an on-screen user interface. In some embodiments, the tag is determined by querying the device for a name or class and associating the name with the respective port.

Figure 5:
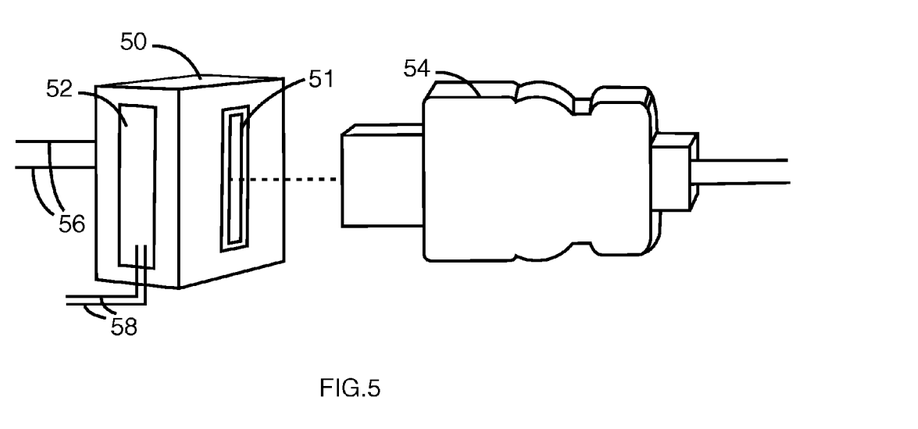
FIG. 5 illustrates a perspective view of an HDMI connector with plug detection.
Figure 6:
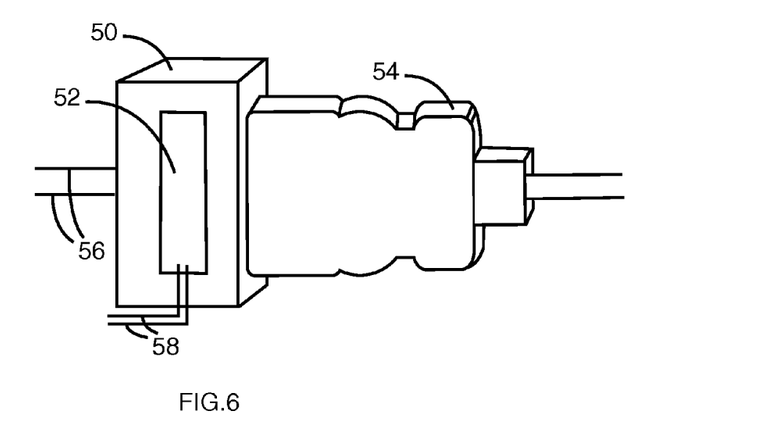
FIG. 6 illustrates a second perspective view of an HDMI connector with plug detection.

Referring to FIGS. 5 and 6, perspective views of an HDMI connector 50 with plug detection will be described. This exemplary HDMI connector 50 has a coil or inductor 52 in proximity to the opening 51 into which the HDMI plug 54 is to be inserted. In order to detect whether a plug 54 is inserted into the opening 51, one or more known frequencies with known amplitudes are emitted over lead wires 58 to the coil 52 while measuring the current drawn by the coil 52. When the HDMI plug 54 is absent from the opening 51, a first current is measured. When the HDMI plug 54 is present in the opening 51, a second current is measured due to a change in the impedance of the coil 52 caused by the metallic mass of the plug 54. The difference in the current is used to determine is a cable connector or plug 54 is plugged into the opening 51 of the HDMI connector 50.

In other embodiments, other mechanism are used including, but not limited to, a micro switch that changes state when the plug 54 is inserted into the HDMI connector 50, a light interrupter in which the light is interrupted by the presence of the plug 54 inserted into the HDMI connector 50, etc.

Furthermore, in some embodiments, other methods are used to determine if a secondary device is connected to the input port(s) including, but not limited to, detecting the presence of an audio signal, detecting the presence of a video signal, sending a query to the secondary device and receiving a response, etc.

Figure 7:
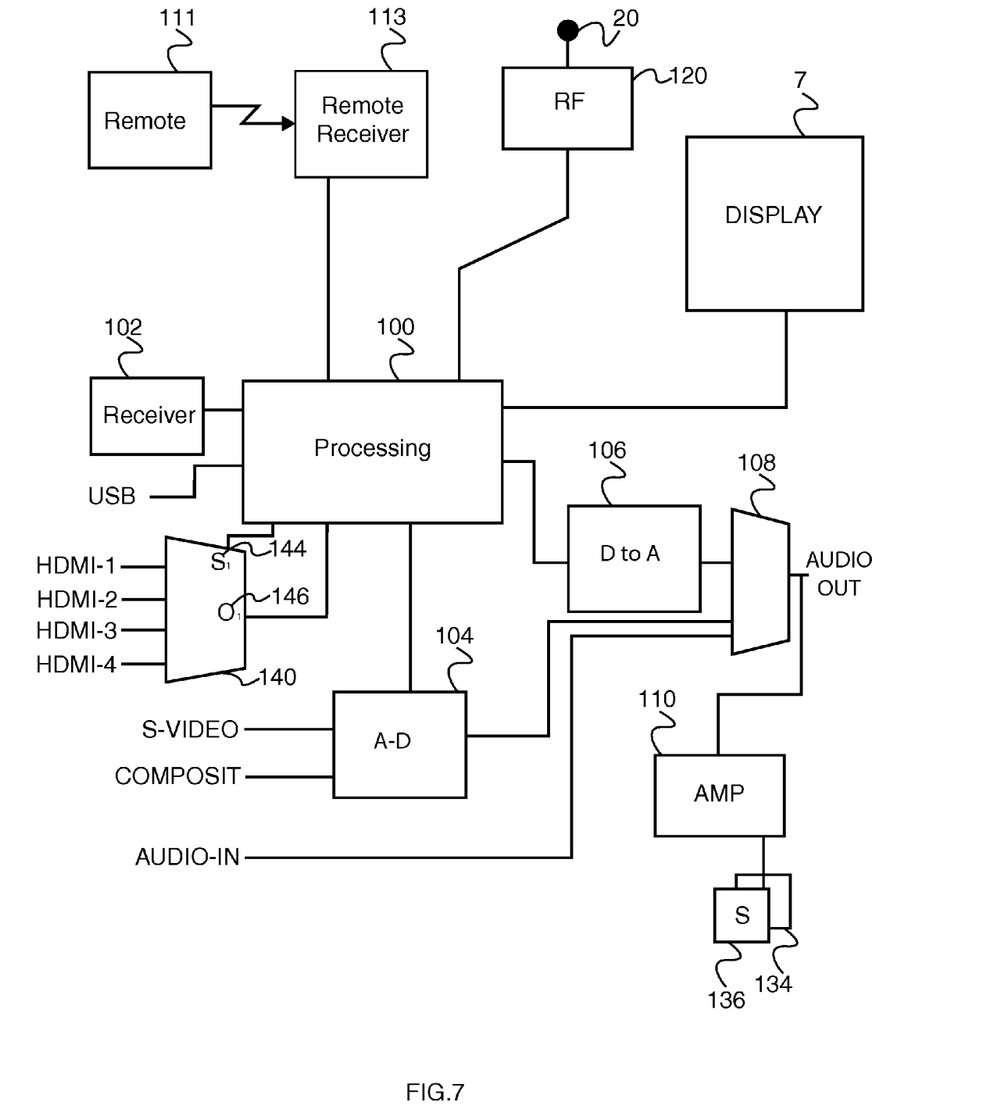
FIG. 7 illustrates a block diagram of a typical television system.
Figure 8:
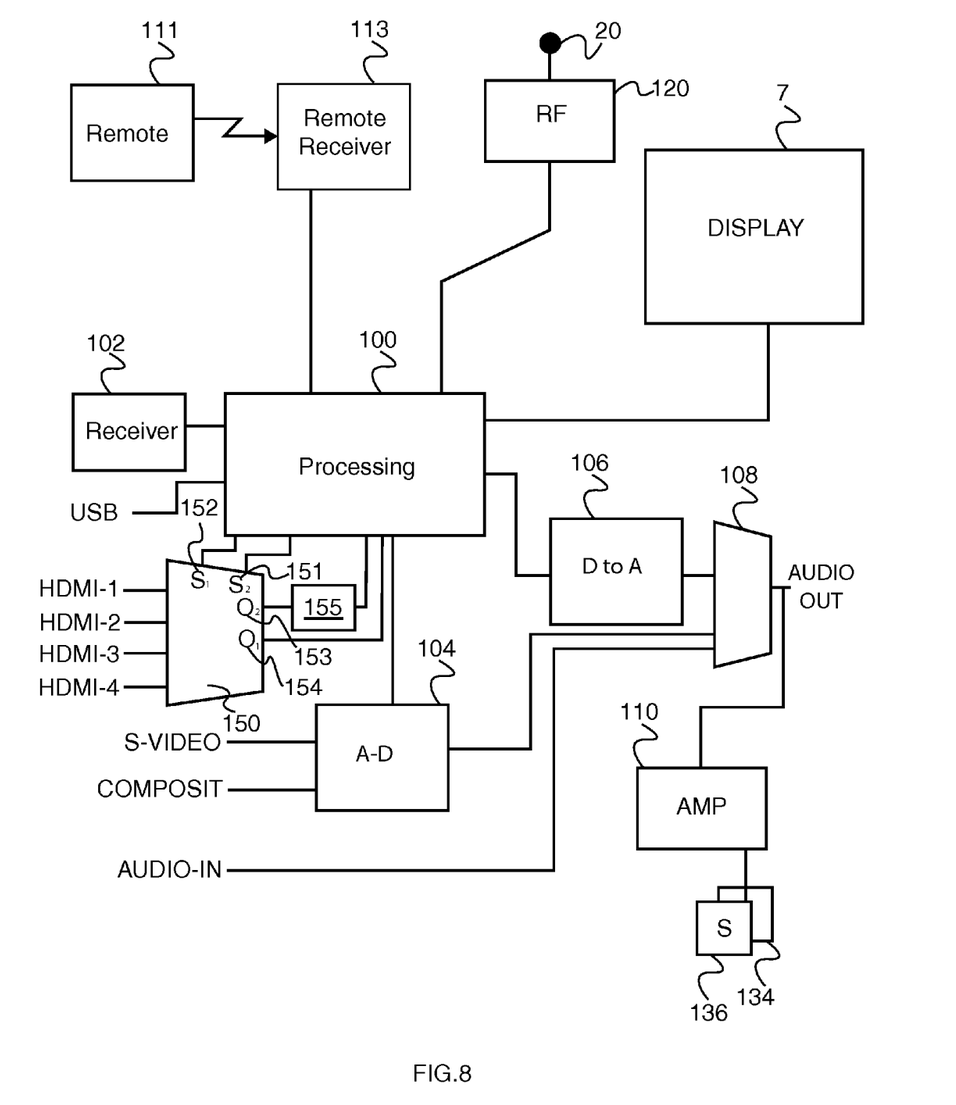
FIG. 8 illustrates a block diagram of a second typical television system.

Referring to FIGS. 7 and 8, schematic views of exemplary televisions 5 will be described. This figure is intended as a representative schematic of a typical monitor/television 5 and in practice, some elements are not present in some monitors/televisions 5 and/or additional elements are present in some monitors/televisions 5 as known in the industry. In this example, a display panel 7 for content is connected to a processing element 100. The display panel 7 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High Definition Multimedia Interface (HDMI 1-4), USB ports and an analog-to-digital converter 104. The analog-to-digital converter 104 accepts analog inputs from legacy video sources such as S-Video and Composite video and converts the analog video signal into a digital video signal before passing it to the processing element.

In the exemplary embodiment of FIG. 7, multiple ports (in this example, HDMI ports) are multiplexed to the processing element 100 by a multiplexor 140. The multiplexor 140 is controlled by a selection input 144 that is controlled by the processing element 100. In this, the processing element 100 sets the selection input 144 to address the desired port and the port (e.g. HDMI-1) is connected to the multiplexor's 140 output 146. The multiplexor's output 146 is connected to the processing element 100 as typical of a directly connected digital port. In alternate embodiments each individual HDMI input is directly connected to the processing element 100, in some cases by amplifier and shaping circuits as known in the industry.

In the exemplary embodiment of FIG. 8, multiple ports (in this example, HDMI ports) are multiplexed to the processing element 100 by a dual channel multiplexor 150 (or two individual multiplexors). A first channel of the multiplexor 150 is controlled by a selection input 152 and a second channel of the multiplexor 150 is controlled by a second selection input 151, both being controlled by the processing element 100. In this, the processing element 100 sets the selection inputs 151/152 to address the desired port. The selection inputs 151/152 have a setting that disables (e.g. tri-state) its respective multiplexor. For example, the first selection input 152 has a setting value that disconnects all of the ports from the processing element 100 and setting values to connect each of the ports (e.g. HDMI-1, etc) to the multiplexor's first output 154. The multiplexor's first output 154 is connected to the processing element 100 to convey, for example, video data from digital port to the processing element 100. In alternate embodiments each individual HDMI input is directly connected to the processing element 100, in some cases by amplifier and shaping circuits as known in the industry.

Most multiplexors 150 are bi-directional, allowing signals to pass from the ports to the processing element 100 and, likewise, allowing signals to pass from the processing element 100 to the ports. In this example, to test if each port is connected to a device (e.g., a DVD player), the processing element 100 sets the first selection inputs 152 to disconnect (e.g. disconnect, tri-state, high-impedance) all HDMI inputs from the processing element 100. The processing element 100 then sequentially sets the second selection inputs 151 to sequentially address each HDMI port, sequentially connecting each port to a testing device 155. The testing device 155 is, for example, a frequency source emitting one or more known frequencies at one or more known amplitudes and measuring the current. In some embodiments, the testing device 155 is connected to the coil 52 to determine if a HDMI plug is present in the associated HDMI connector 50 as described with FIGS. 5 and 6. In some embodiments, the testing device 155 is connected to the signal conductors 56 of the HDMI connector 50. In some embodiments, the testing device 155 is connected to a micro switch or light detector associated with the HDMI connector 50. If no plug is present in the connector 50, the signal conductors (or coil 52, micro switch or light detector) will measure a high impedance. If a plug is present in the connector 50, but the cable is not connected to a device, the signal conductor will measure a slightly lower impedance depending on the frequency. This is due to the capacitance of the cable and will vary between lengths and manufacturers of cables. If a plug is present and is connected to a device and the device is not powered, then the signal conductors will measure a significantly lower impedance. If a cable is present and is connected to a device and the device is powered, then a digital signal will be present on the signal conductors.

In another embodiment, the ports are first scanned using the first multiplexor 150 to determine which ports have a signal present (analog or digital) coming from a device that is plugged into that port, then those ports having a signal are marked as connected and active by the processing element 100 and an impedance test is not performed on the ports already marked as connected and active.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 134/136.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

In some embodiments, the television 5 connects to networks through a wireless network interface 120 having an antenna 20. In some embodiments, the television connects to a local area network using a local area network adapter 124 for connecting to, for example, an Ethernet local area network or a power line local area network, as known in the industry. In some embodiments, the processor 100 communicates to an Internet-based service through the wireless network interface 120 or the local area network 124 to determine when two-dimensional or three-dimensional content is being displayed.

Figure 9:
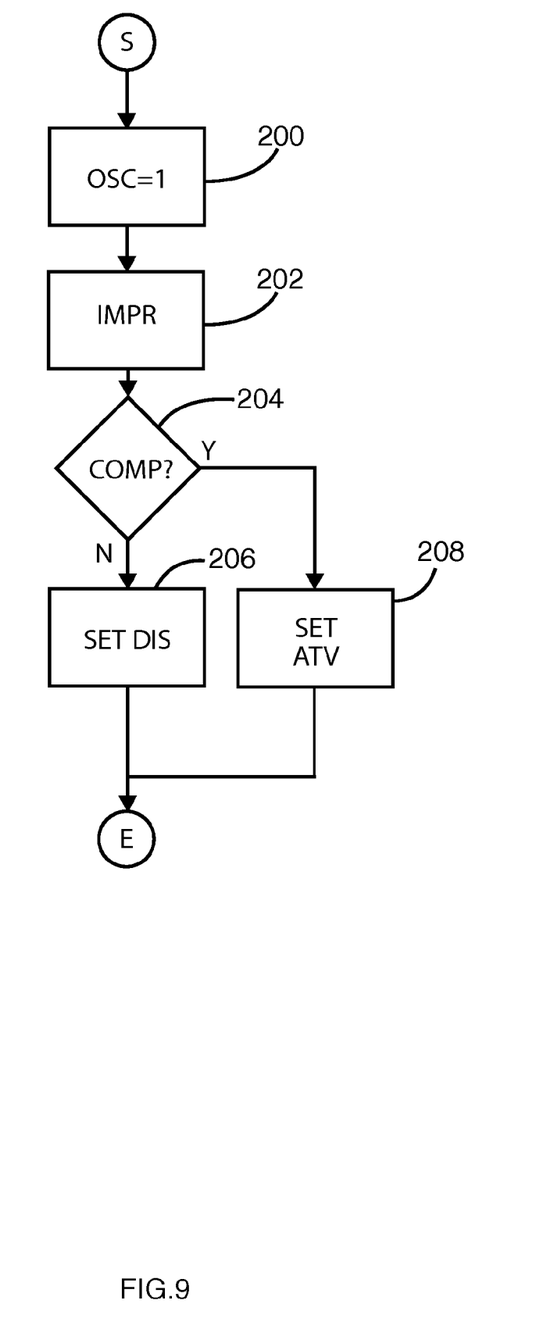
FIG. 9 illustrates a flow chart running within the television.

Referring to FIG. 9, a flow chart running within the television 5 will be described. This program flow is an example of measuring the port to determine if a device is connected. To start, an oscillator is connected to the port 200, emitting a known amplitude and frequency. Next, an impedance or current measurement is made 202 to determine the impedance of either the coil 52 or signal lines 56 (or micro switch or light detector, etc). The measured impedance is compared 204 to expected values and if it is less than an expected value (low impedance means a device or plug is connected), the port is marked 208 as active. Otherwise, if it is higher than the expected value (high impedance means no device or plug is connected), the port is marked 206 as inactive.

Figure 10:
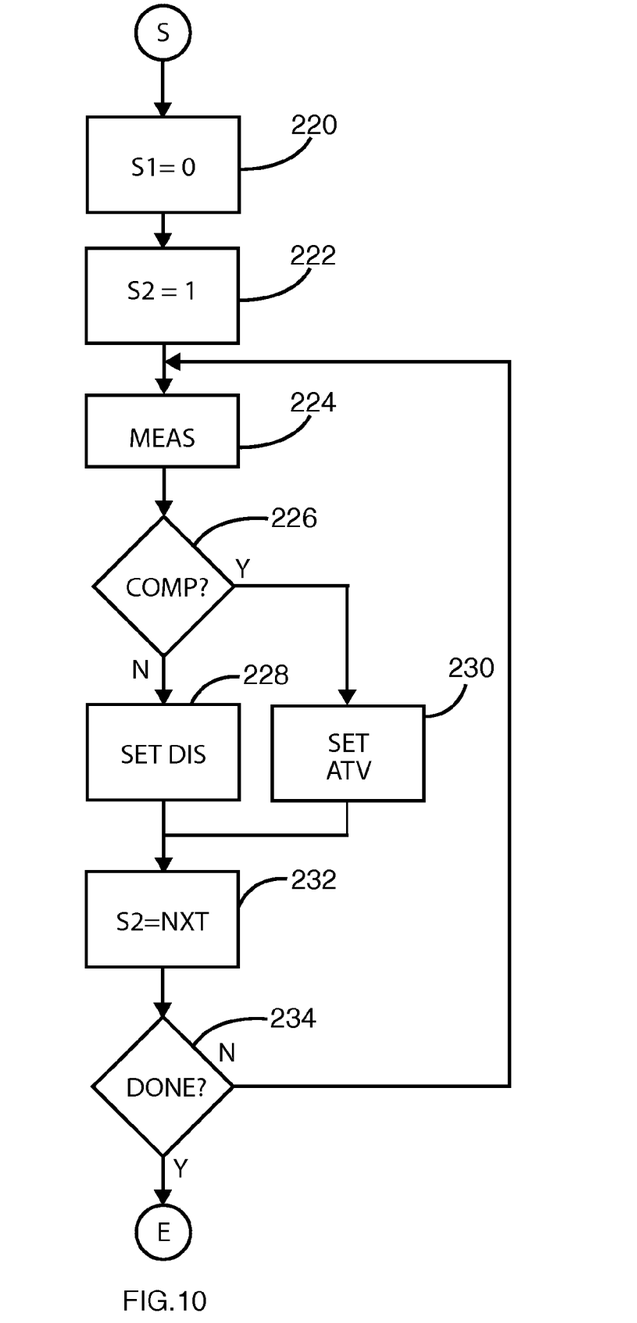
FIG. 10 illustrates a second flow chart running within the television.

Referring to FIG. 10, a second flow chart running within the television 5 will be described. In conjunction with the multiplexor 150 of FIG. 8, the first multiplexor 150 is disabled 220 and the second multiplexor 150 is set 222 to connect the measurement device 155 to the signal leads of the first port 50 (or coil 52 of the first port 50). Next, a measurement 224 of the impedance of either the signal leads 56 or the coil 52 is made and the impedance is compared 226 to an expected value. If the impedance is lower than the expected value, the current addressed port is marked 230 as connected. If the impedance is higher than the expected value, the current addressed port is marked 228 as not connected. Next, the second multiplexor 150 is set 232 to connect the measurement device 155 to the signal leads of the next port 50 (or coil 52 of the first port 50). If there are more 234 ports 50, then the steps are repeated to determine if that port 50 is connected. If there are no more 234 ports 50, then it is now known which ports 50 have attached devices.

It is anticipated that when second multiplexor 150 is set 232 to connect the measurement device 155 to the signal leads of the next port 50 for an impedance measurement, the second multiplexor 150 connects the measurement device 155 to any of two or more signal lines 56, a coil 52 associated with the port, a micro-switch associated with the port 50, a light sensor associated with the port 50, etc.

Equivalent elements can be substituted for the ones set forth above such that they perform in substantially the same manner in substantially the same way for achieving substantially the same result.

It is believed that the system and method and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for determining which input ports of a primary device are connected to devices, the system comprising:
the primary device having a plurality of input ports;
a port determining part, operating to determine which of the input ports is connected to respective devices, and which of the input ports are unconnected, said primary device operating according to a determination made by said port determining part, to display a selection list identifying the input ports that are connected to respective devices in a different way than the input ports that are not connected,
wherein said port determining part includes a multiplexer that has multiple inputs connected to said input ports and at least first and second outputs, and wherein said multiplexer is controllable to have a tri-state capability;
wherein said port determining part includes a testing device, that tests to determine if a cable is connected to a port to which the testing device is connected, said testing device connected to said first output of said multiplexer,
wherein the port determining part detects a metallic mass of a connector,
said second output of said multiplexer connected to provide video content to the primary device, and
a processor, that controls operation of the primary device and of the port determining part, and of the multiplexer, said processor controlling sequential connection of each of the multiple inputs to be output over said first output of the port determining part to be sequentially connected to each of the ports through said multiplexer while a second output is held in a tri-state state during a time when said testing device is testing said each of said multiple inputs.

2. The system of claim 1, wherein the port determining part uses a coil on said side surface to detect said metallic mass.

3. A system for determining which input ports of a primary device are connected to devices, the system comprising:
the primary device having a plurality of input ports;
a port determining part, operating to determine which of the input ports is connected to respective devices, and which of the input ports are unconnected, said primary device operating according to a determination made by said port determining part, to display a selection list identifying the input ports that are connected to respective devices in a different way than the input ports that are not connected, wherein said port determining part includes a multiplexer that has multiple inputs connected to said input ports and at least first and second outputs, and wherein said multiplexer is controllable to have a tri-state capability;
wherein said port determining part includes a testing device, that tests to determine if a cable is connected to a port to which the testing device is connected, said testing device connected to said first output of said multiplexer, wherein the port determining part uses a microswitch for detecting presence of a connector said second output of said multiplexer connected to provide video content to the primary device, and
a processor, that controls operation of the primary device and of the port determining part, and of the multiplexer, said processor controlling sequential connection of each of the multiple inputs to be output over said first output of the port determining part is sequentially connected to each of the ports through said multiplexer while a second output is held in a tri-state state during a time when said testing device is testing said each of said multiple inputs.

4. The system of claim 3, wherein said primary device displays a menu whereas a subset of the input ports is listed in the menu, the subset representing input ports that are connected to the respective devices.

5. The system of claim 3, further comprising said primary device including a port toggle function initiated by a received control, where the port toggle function automatically selects a next port from a list of the input ports that have secondary devices connected and automatically skips ports that do not have said secondary devices connected.

6. A system for determining which input ports of a primary device are connected to devices, the system comprising:
the primary device having a plurality of input ports;
a port determining part, operating to determine which of the input ports is connected to respective devices, and which of the input ports are unconnected, said primary device operating according to a determination made by said port determining part, to display a selection list identifying the input ports that are connected to respective devices in a different way than the input ports that are not connected, wherein said port determining part includes a multiplexer that has multiple inputs connected to said input ports and at least first and second outputs, and wherein said multiplexer is controllable to have a tri-state capability;
wherein said port determining part includes a testing device, that tests to determine if a cable is connected to a port to which the testing device is connected, said testing device connected to said first output of said multiplexer,
said second output of said multiplexer connected to provide video content to the primary device, and
a processor, that controls operation of the primary device and of the port determining part, and of the multiplexer, said processor controlling sequential connection of each of the multiple inputs to be output over said first output of the port determining part is sequentially connected to each of the ports through said multiplexer while a second output is held in a tri-state state during a time when said testing device is testing said each of said multiple inputs, and further comprising a processor in the primary device, and where said second output of said multiplexer is connected to said processor.

7. A method of determining which ports of a primary device are connected to a secondary device, the method comprising:
selecting a first input port of the primary device as a current port;
detecting a physical connection of respective connectors into at least one of multiple input ports, wherein the detecting is done through a multiplexer that has multiple inputs connected to said input ports and at least first and second outputs, and wherein said multiplexer is controllable to have a tri-state capability, and where said detecting is done using a testing device for testing to determine if a cable is connected to a port to which the testing device is connected, said testing device connected to said first output of said multiplexer, and said second output of said multiplexer connected to provide video content to the primary device, and
using a processor to control operation of the primary device and of the detecting, said processor controlling sequential connection of each of the multiple inputs to be output over said first output, such that each of said inputs is sequentially connected to each of the ports through said multiplexer while a second output is held in a tri-state state during a time when said testing device is testing said each of said multiple inputs.

8. The method of claim 7, wherein the detecting comprises detects a metallic mass of the connector.

9. The method of claim 8, wherein the detecting uses a coil to detect said metallic mass being in proximity of the input port.

10. A television comprising:
a processor that controls functions of the television;
a multiplexer, having a plurality of input ports and at least first and second output ports, where said first output port is connected to said processor, wherein said multiplexer is controllable to have a tri-state capability;
a port detection device that, along with software running on the processor, that determines if each of the input ports are connected to a secondary device, said port detection device connected to said second output port of said multiplexer and operating to determine if said input ports are connected to a secondary device, and to provide information to said processor about which of said input ports are connected to said secondary device, where said port detection device tests to determine if a cable is connected to a port to which the port detection device is connected by emitting a frequency and testing a current that is drawn, said processor connected to said first output of said multiplexer;
said multiplexer controlled by said processor, such that while said port detection device is determining if said input port is connected to a secondary device, said first output to said processor is maintained in a high impedance, tristate inactive state, and
wherein said processor includes software running on the processor that controls operation of the television and of the port detection device, said processor controlling sequential connection of each of the input ports to be output over said first output of the port detection device is sequentially connected to each of the ports through said multiplexer while a second output is held in a tri-state state during a time when said port detection device is testing said each of said ports and that presents a list of input ports based upon which input ports are connected to said secondary device and shows input ports that are not connected to said secondary device in a different way than said input ports that are connected to said secondary device.

11. The television of claim 10, wherein the plurality of input ports includes at least two high definition multimedia interface (HDMI) ports.

12. The television of claim 10, further comprising software running on the processor that displays a menu whereas a subset of the input ports is listed in the menu, the subset representing input ports that are connected to the secondary device.

13. The television of claim 10, further comprising software running on the processor that performs a port toggle function initiated by a remote control whereas the port toggle function selects a next input port from a list of the input ports that have secondary devices connected.

* * * * *